(12) United States Patent
Jain et al.

(10) Patent No.: US 8,443,145 B2
(45) Date of Patent: *May 14, 2013

(54) DISTRIBUTED MEMORY USAGE FOR A SYSTEM HAVING MULTIPLE INTEGRATED CIRCUITS EACH INCLUDING PROCESSORS

(75) Inventors: Raj Kumar Jain, Singapore (SG); Xiao Ni Wei, Singapore (SG); Pin Xing Lin, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 113 days.

This patent is subject to a terminal disclaimer.

(21) Appl. No.: 13/098,148

(22) Filed: Apr. 29, 2011

(65) Prior Publication Data

US 2011/0209009 A1    Aug. 25, 2011

Related U.S. Application Data

(63) Continuation of application No. 11/345,645, filed on Feb. 1, 2006, now Pat. No. 7,941,604.

(51) Int. Cl.
*G06F 12/00* (2006.01)
*G06F 13/00* (2006.01)
*G06F 13/28* (2006.01)

(52) U.S. Cl.
USPC ........... 711/120; 711/125; 711/137; 711/154; 711/167

(58) Field of Classification Search .................. 711/120, 711/125, 137, 154, 167
See application file for complete search history.

(56) References Cited

U.S. PATENT DOCUMENTS

| 5,432,918 | A | 7/1995 | Stamm |
| 5,499,355 | A | 3/1996 | Krishnamohan et al. |
| 5,708,784 | A * | 1/1998 | Yanai et al. .................. 710/119 |
| 5,900,862 | A | 5/1999 | Silverbrook et al. |
| 6,092,097 | A | 7/2000 | Suzuoka |
| 6,314,491 | B1 | 11/2001 | Freerksen et al. |
| 6,621,304 | B2 | 9/2003 | Jain |
| 2002/0035674 | A1 | 3/2002 | Vetrivelkumaran et al. |
| 2003/0009706 | A1 | 1/2003 | Day et al. |
| 2003/0088744 | A1 | 5/2003 | Jain et al. |
| 2004/0181786 | A1 | 9/2004 | Allison |

OTHER PUBLICATIONS

Handy, J., "The Cache Memory Book," 1998, p. 89-94, Second Edition, Academic Press.
Hennessy, J. L., et al., "Computer Organization and Design, The Hardware/Sorftware Interface," 1998, p. 655, Second Edition, Morgan Kaufmann Publishers, Inc., San Francisco, Ca.

* cited by examiner

*Primary Examiner* — Christian P Chace
*Assistant Examiner* — Ryan Bertram
(74) *Attorney, Agent, or Firm* — Slater & Matsil, L.L.P.

(57) ABSTRACT

A plurality of integrated circuits in a system, each having a program memory loaded with different sections of a program, and a second memory. The integrated circuits perform the program, such that, when one of the integrated circuits requires a portion of the program, which is contained in its own program memory, it extracts it from the program memory and uses it, but when it requires a portion of the program, which is not contained in its own program memory, it reads it from the program memory of one of the other integrated circuits into its second memory and runs that portion of the program from there. In one example, the system is a line card, and the program is specific to one DSL protocol.

33 Claims, 7 Drawing Sheets

FIG 11

DISTRIBUTED MEMORY USAGE FOR A SYSTEM HAVING MULTIPLE INTEGRATED CIRCUITS EACH INCLUDING PROCESSORS

This application is a continuation of patent application Ser. No. 11/345,645, entitled "Distributed Memory Usage for a System Having Multiple Integrated Circuits Each Including Processors," filed on Feb. 1, 2006 now U.S. Pat. No. 7,941,604, which application is incorporated herein by reference in its entirety.

TECHNICAL FIELD

The present invention relates to a system using multiple integrated circuits each comprising processors and an internal memory, to a method performed by the system, and to an integrated circuit for use in the system. The invention is applicable particularly, but not exclusively, in the case that the system is a line card.

BACKGROUND

Many applications make use of a system having a plurality of integrated circuits, each having a processor and internal program memory for storing program code to be run by the processor.

One example of such a system is called a "line card". A digital subscriber line (DSL) extends between a telephone service provider's central office and an end user's location. The physical termination at the central office is provided by a line card, which includes a plurality of integrated circuits, each responsible for communication with one or more end user locations. These integrated circuits have a high computational burden, and operate by processing highly complex computationally intense software, which requires a high level of internal program memory.

SUMMARY OF THE INVENTION

Embodiments of the present invention aim to provide a new and useful system incorporating multiple integrated circuits, a method for use by such a system, and a processor for use in such a system.

In general terms, a first preferred embodiment of the present invention proposes that a plurality of integrated circuits each have a program memory loaded with different sections of a program, and a second memory. The integrated circuits perform the program, such that, when one of the integrated circuits requires a portion of the program contained in its own program memory, it extracts it from the program memory and uses it, but when it requires a portion of the program, which is not contained in its own program memory, the integrated circuit of interest reads the program portion from the program memory of one of the other integrated circuits into its own second memory, and then runs that portion of the program from there.

Thus, the amount of the program that each of the integrated circuits has to store at any one time is less than the entire program. This smaller storage need very significantly reduces the manufacturing cost of the integrated circuits.

For example, if the number of integrated circuits is N, and if each of the integrated circuits stores an equal proportion of the program in its program memory, each of the integrated circuits only has to store 1/N-th of the program in its program memory. In fact, it is preferred that the program memory of each of the integrated circuits has the same respective capacity. In fact, it is preferred that the integrated circuits are substantially identical. Alternatively, however, the integrated circuits may vary in the amount of storage and in other aspects, while still remaining within the scope of the invention.

Note it is not essential to the invention that the entirety of the program is stored within the integrated circuits collectively. Rather, the line card may in a further alternative embodiment include a memory unit outside the set of integrated circuits, and storing a portion of the program. The integrated circuits read portions of the program from the memory unit as required.

Typically, each integrated circuit communicates with the other integrated circuits to ensure that by the time the integrated circuit requires a given portion of the program, it is already present within the integrated circuit. This means that the processing of the program is not interrupted until a missing portion of the program is uploaded into the integrated circuit.

The communication of program code between the integrated circuits (and additional memory unit, if provided) may be via at least one data bus. This communication requires an arbitration mechanism for sharing control of the data bus. Any arbitration mechanism may be used, such as a round robin scheme.

In one preferred embodiment, the arbitration mechanism may be implemented using an arbitration bus, which the integrated circuits can use to relinquish control of the data bus.

The arbitration mechanism preferably includes a watchdog mechanism for ensuring that, if one of the integrated circuits ceases operation (e.g., if it crashes and has to reinitialize), the arbitration is not suspended. In these circumstances, the arbitration process should continue, sharing access to the data bus among the integrated circuits, which remain in operation.

This watchdog mechanism may include a timer mechanism, which passes control of the data bus away from a given integrated circuit after a pre-determined time, if that integrated circuit has not already done so. Specifically, each of the integrated circuits may include a respective timer mechanism, which in the case that that integrated circuit does not pass control of the data bus to another integrated circuit within the pre-determined time, transfers control of the data bus to another of the integrated circuits.

In the case that not all of the integrated circuits operate according to a common clock signal, one or more (typically all) of the integrated circuits include a synchronization mechanism, which permits a synchronization of the operation of the respective integrated circuit with signals received from the other integrated circuits, e.g., over the data bus. This makes it less likely the data transmitted between the integrated circuits will be received erroneously. Preferably, the synchronization mechanism includes one or more flip-flop circuits to form delayed versions of a signal received from outside the respective integrated circuit and indicative of the timing of one of the other integrated circuits. These multiple versions of the signal can be used to form a synchronization signal, which accurately indicates the difference between the clock signals of the two integrated circuits. Optionally, the number of flip-flop circuits that are actually employed may be variable (e.g., programmable). For example, it may be expedient to use a different number of flip-flop circuits according to the number of integrated circuits.

In another preferred embodiment, the memory unit also may include a synchronization mechanism.

One example of an application of the system is as a line card. In this case, the program that each of the integrated circuits performs may be a DSL protocol-specific program.

Note, however, that the invention is not limited in this respect and that other applications of the invention exist, such as in networking applications, and multiprocessor environments.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
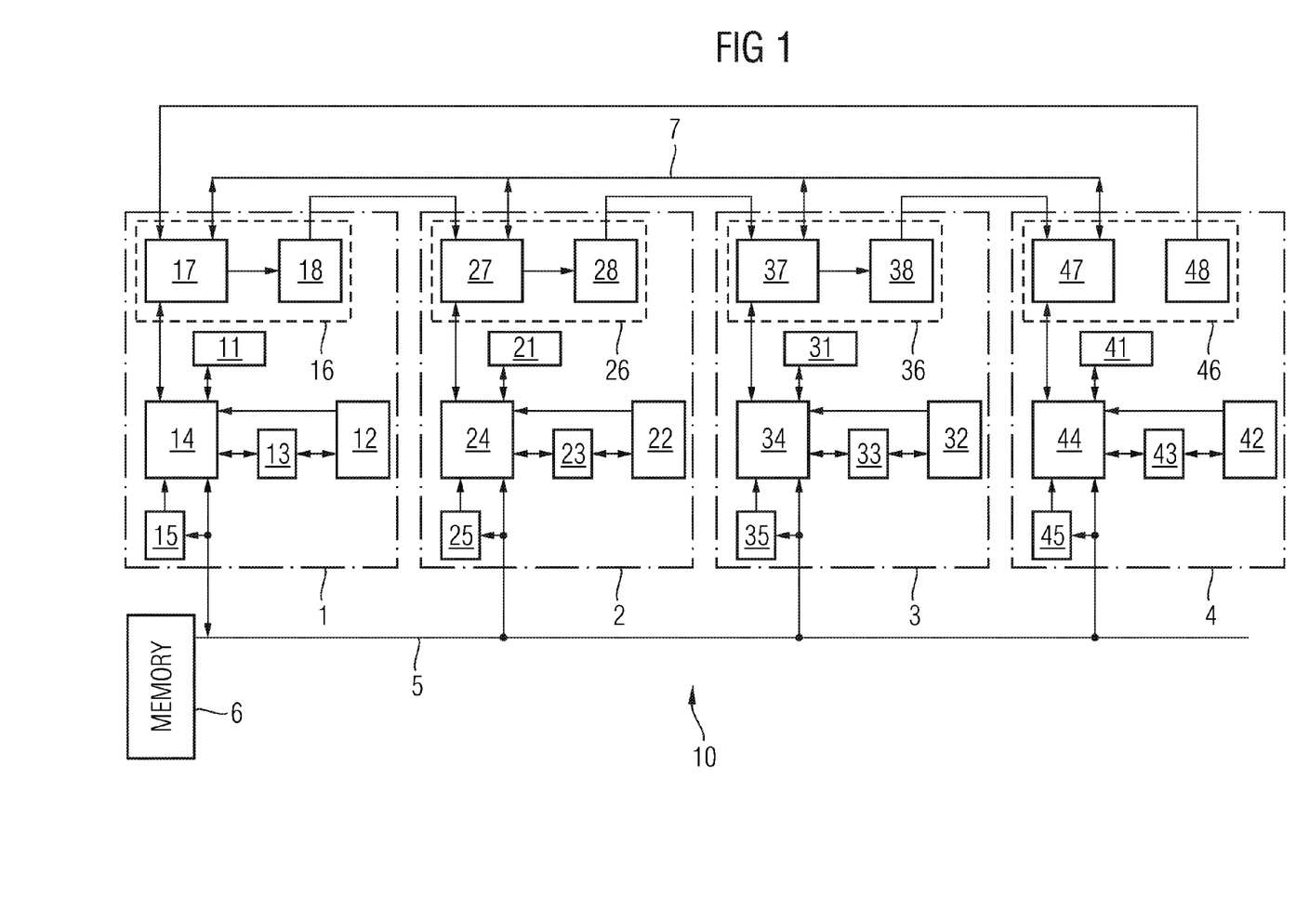
FIG. 1 is a schematic block diagram of a first embodiment of the invention.

Referring to FIG. 1, a block diagram is shown of a portion of a line card 10, which is an embodiment of the invention. The line card 10 includes four integrated circuits 1, 2, 3, 4, each of which is typically a separate integrated circuit device. It is to be understood that the number of integrated circuits may, in other embodiments, be greater or less than four, and more generally, the number of integrated circuits may be denoted as N. The integrated circuits 1, 2, 3, 4 each communicate with a data bus 5.

Optionally, the data bus 5 also communicates with a memory unit 6, which may be an SRAM memory unit. In fact, there may be multiple physically separate SRAM memory units, which together provide the function of the memory unit 6.

Preferably, each of the integrated circuits 1, 2, 3, 4 is substantially identical. They include a respective program memory 11, 21, 31, 41 (which may be an SRAM memory), a respective processor 12, 22, 32, 42, a respective second memory 13, 23, 33, 43, a respective program manager 14, 24, 34, 44 for generating and transmitting signals to the data bus 5 and for receiving signals from the data bus 5, a synchronization unit 15, 25, 35, 45, and a respective arbitration section 16, 26, 36, 46 including a respective arbitration manager 17, 27, 37, 47 and a respective watchdog unit 18, 28, 38, 48. The second memories 13, 23, 33, 43 may be cache memories or swap memories, and typically have both functions. As described below, they are used for pre-fetching of program portions required by the processors 12, 22, 32, 42.

Each of the integrated circuits 1, 2, 3, 4 also includes connections (not shown) to a respective set of one or more communication lines (such as copper wires). The communication lines enable the integrated circuits to send and/or receive signals along the communication lines to respective external user locations. The communication lines are referred to as digital subscriber lines (DSL).

Furthermore, each of the integrated circuits 1, 2, 3, 4 includes further connections (not shown), which enable the integrated circuits 1, 2, 3, 4 to receive from another location data for transmission to the external users along the communication lines, and to transmit to the other location data received from the external users. For example, the integrated circuits 1, 2, 3, 4 may be connected (e.g., via intermediate circuitry) to an optical cable, which extends to the other location, such that the integrated circuits 1, 2, 3, 4 can control the optical cable to transmit data along it, or receive data transmitted to the line card 10 along it.

The communication along the DSLs is in a communication protocol, such as xDSL, which may for example be ADSL or VDSL, or any of the variations of those standards in existence now or which may be proposed in the future. In order to perform communication along the DSLs, the integrated circuits 1, 2, 3, 4 process a program which is specific to the DSL protocol. This processing is performed by the processors 12, 22, 32, 42.

The program memories 11, 21, 31, 41 together define a memory space, and this space is supplemented by the memory unit 6 (if present). This memory space is used for storing the program, as described below.

In an initiation stage, the program memories 11, 21, 31, 41 of the respective integrated circuits 1, 2, 3, 4 are each loaded with a respective section of the program. The program may, prior to this, be stored in a program source, which is located within the line card (e.g., in an additional memory unit not shown in FIG. 1), or by a program source with which the line card 10 is in communication over a communication network.

The uploading of the sections of the programs into the program memories 11, 21, 31, 41 of the integrated circuits 1, 2, 3, 4 can be done under the control of one of the integrated circuits 1, 2, 3, 4, which acts as a master. Supposing that the integrated circuit 1 acts as the master, the arbitration section 16 of the integrated circuit 1 directs that the program manager 14 has control of the data bus 5. The program manager 14 communicates with the program source (e.g., via the data bus 5 is if the data bus 5 is connected to the program source) and receives the program from the program source in successive portions. When a program portion that is to be stored in the program memory 11 of the integrated circuit 1 is received by the program manager 14, it is written to the program memory 11. When the program manager 14 receives a program portion that is to be stored in the program memory 21, 31, 41 of one of the integrated circuits 2, 3, 4, the program manager 14 transmits that program portion to the data bus 5, together with a write instruction and an address in the shared memory space. The one of the integrated circuits 2, 3, 4 having the program memory 21, 31, 41, which includes that address, takes the program portion from the data bus 5, and stores it in its program memory 21, 31, 41.

Figure 2:
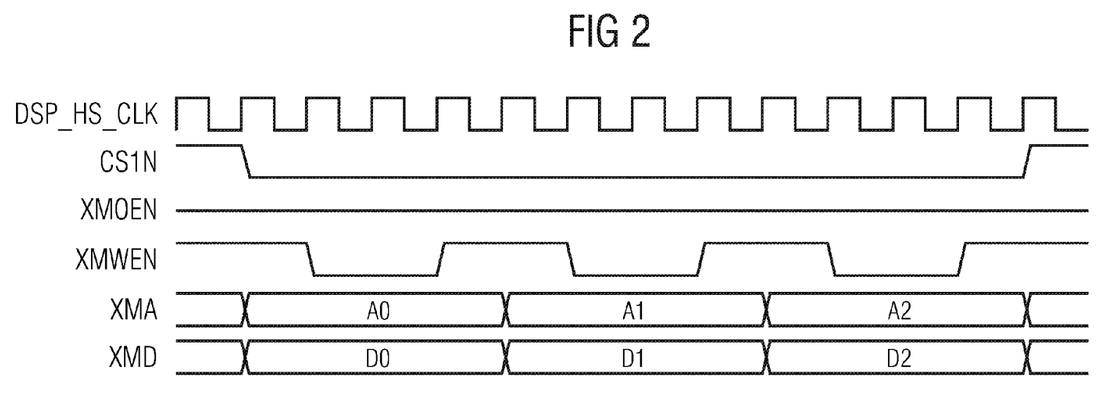
FIGS. 2 to 7 are timing diagrams illustrating respective read or write operations performed by the embodiment of FIG. 1.

The signals transmitted along the data bus 5 during this write operation are shown in FIG. 2, in relation to the clock signal DSP_HS_CLK of the integrated circuit 1. The data bus 5 includes: a line CS1N for transmitting an activation signal and which the program manager 14 changes from high to low to indicate that it is about to send a command on the data bus 5 having relevance to one of the integrated circuits 2, 3, 4; a line XMOEN, which is changed from high to low to indicate that program manager 14 wants to read data (and which therefore remains high during the write operation presently being described); a line XMWEN, which the program manager 14 can change from high to low to indicate that the program manager intends to write data; one or more lines XMA for transmitting an address in the memory space; and one or more lines XMD for carrying the program portions as data.

Actually, the data bus 5 includes a further line CS2N, which the program manager 14 can change from high to low to indicate that the program manager 14 is about to send a command to the memory unit 6. However, since this does not apply to the scenario illustrated in FIG. 2, the signal on this line during this process is not shown in FIG. 2. Line CS2N remains high during the whole process of FIG. 2, indicating that the data on the data bus 5 has no relevance to the memory unit 6.

Thus, in FIG. 2, the program manager 14 changes the signal on line CS1N from high to low to indicate that it intends to use the data bus 5, then changes the signal on line XMWEN from high to low to indicate that it intends to transmit data. It then uses line(s) XMA to transmit an address in the shared memory space, and lines XMD to transmit the program portion itself. The program manager of one of the integrated circuits 2, 3, 4 recognizes the address in the shared memory space as an address, which corresponds to an address in the respective program memory of that integrated circuit, and accordingly, writes the program into that program memory.

By repetition of this process, the whole of the DSL program can be written into the shared memory space, provided that this space is sufficiently large to contain it. In certain applications, however, the DSL program may be too large to fit into the part of shared memory space provided by the program memories 11, 21, 31, 41. Even if the program memories 11, 21, 31, 41 are collectively large enough to store all existing DSL programs, they may not be large enough to store programs that are proposed in the future.

Figure 3:
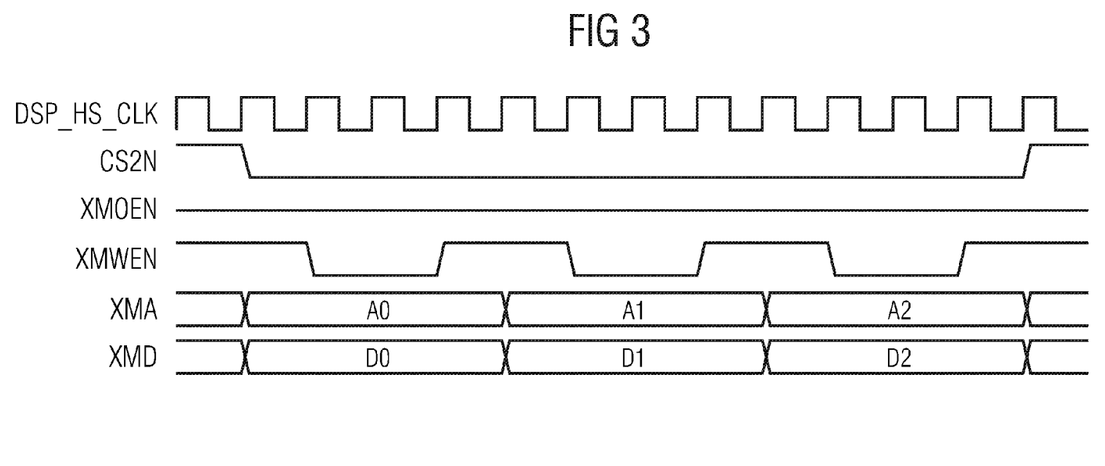

Accordingly, during the initiation stage, the master integrated circuit 1 may store one or more program portions in the memory unit 6, when it is present. In this case, when the program manager 14 of the integrated circuit 1 receives a program portion to be stored in the memory unit 6, it controls the data bus 5 so that its lines carry the signals shown in FIG. 3. FIG. 3 is identical to FIG. 2, except that FIG. 3 indicates the signals on the data bus line CS2N, instead of on the line CS1N. (In fact, the line CS1N remains high during the process shown in FIG. 3, thereby indicating to the integrated circuits 2, 3, 4 that the data on the data bus 5 is of no relevance to them.) The memory unit 6 recognizes the transition from high to low on the line CS2N shown in FIG. 3, and accordingly registers the write signal XMWEN. Due to this signal, it writes the program portion transmitted on the lines XMD to the address indicated by the lines XMA.

The working phase of the operation of line card 10 will now be described. During this phase, the integrated circuits 1, 2, 3, 4 act equivalently, so without loss of generality, the operation of integrated circuit 1 is described.

In this operation phase, the processor 12 performs the DSL-protocol-specific program. The program manager 14 continually monitors the progress of the processor 12, and attempts to ensure that the program portion, which the processor 12 requires at any time, is stored in the second memory 13. Furthermore, the program manager 14 attempts to ensure that at any time the second memory 13 also stores the program portions, which the processor 12 will require during the following times. For example, if the second memory is capable of storing 4 program portions (assumed for the moment to be of equal size), then the program manager 14 will attempt to arrange at any time that the second memory 13 stores both the program portion the processor 12 presently needs, and the also the next three program portions the processor 12 will need.

The exact number of program portions stored at any time in the second memory 13 depends upon the size of the second memory 13, and the larger the second memory 13 the less risk there is of the processor 12 running out of code. The processor 12 will never run out of program portions so long as the program manager 14 successfully arranges that at least the program portion that the processor 12 requires next is stored in the second memory 13. Thus, the operation of the processor 12 can be as smooth and as fast as if the whole of the program were stored within the integrated circuit 1.

The second memory 13 may be arranged as a first-in-first-out memory. Whenever the program manager 14 determines that the processor 12 no longer requires a certain program portion, it loads a new program portion into the second memory 13, thereby erasing the program portion, which is no longer required.

When the program manager 14 determines that it should load into the second memory 13 a program portion, which is stored in the program memory 11, it does so, by reading the program portion from the memory 11, and then writing it to the second memory 13.

If the program manager 14 determines that it should load into the second memory 13 a program portion, which is not stored in the program memory 11, it issues an instruction to the arbitration manager 17 to gain control of the data bus 5. Once the arbitration manager 17 indicates to the program manager 17 that this has been achieved (by the process described below, for example), the program manager 17 controls the data bus 5 to obtain this program portion using the data bus 5.

Figure 4:
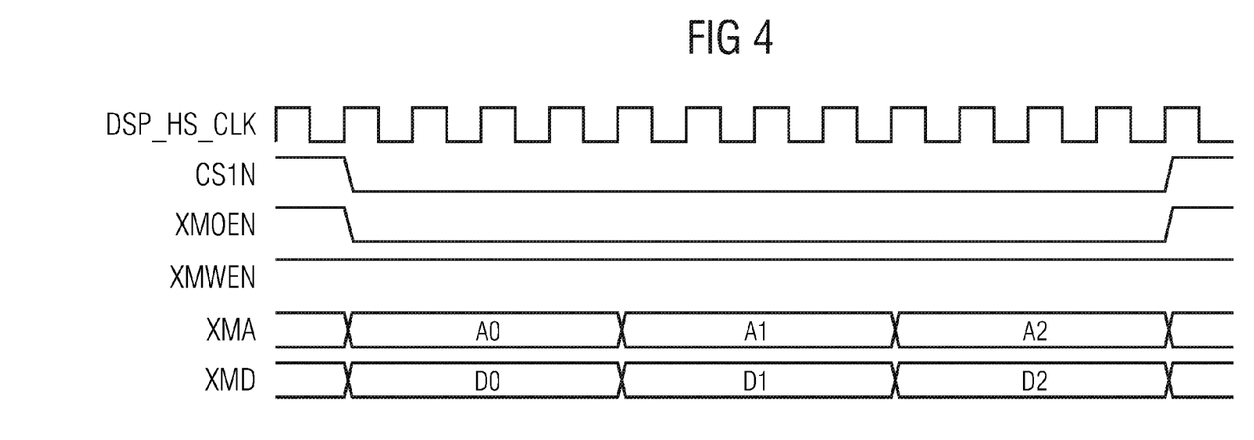

If the required program portions is stored in the program memory 21, 31, 41 of one of the integrated circuits 2, 3, 4, the program manager 14 transmits the signals shown in FIG. 4 on lines CS1N, XMOEN, XMWEN and XMA. This figure resembles FIG. 2, except that, to indicate the read request, the program manager changes the line XMOEN from high to low. The integrated circuit 2, 3, 4 which contains the address corresponding to the signal transmitted on line(s) XMA recognizes the address, and transmits the corresponding program portion on the lines XMD. The program manager 14 of integrated circuit 1 receives this data, extracts the program portion, and loads it into the second memory 13.

If the required program portion is stored in the memory unit 6, the program manager 17 controls the data bus 5 to transmit the signals shown in FIG. 4 on lines CS2N, XMOEN, XMWEN and XMA. This figure resembles FIG. 3, except that, to indicate the read request, the program manager changes the line XMOEN from high to low instead of the line XMWEN. The memory unit 6 recognizes the address transmitted on line(s) XMA as a valid read request, and transmits the corresponding program portion on the lines XMD. The program manager 14 of integrated circuit 1 receives this data, extracts the program portion, and loads it into the second memory 13. Although this example was described in terms of program manager 14, other program managers 24, 34, and 44, which reside in integrated circuits 2, 3 and 4 could be the master in a given example.

Figure 5:
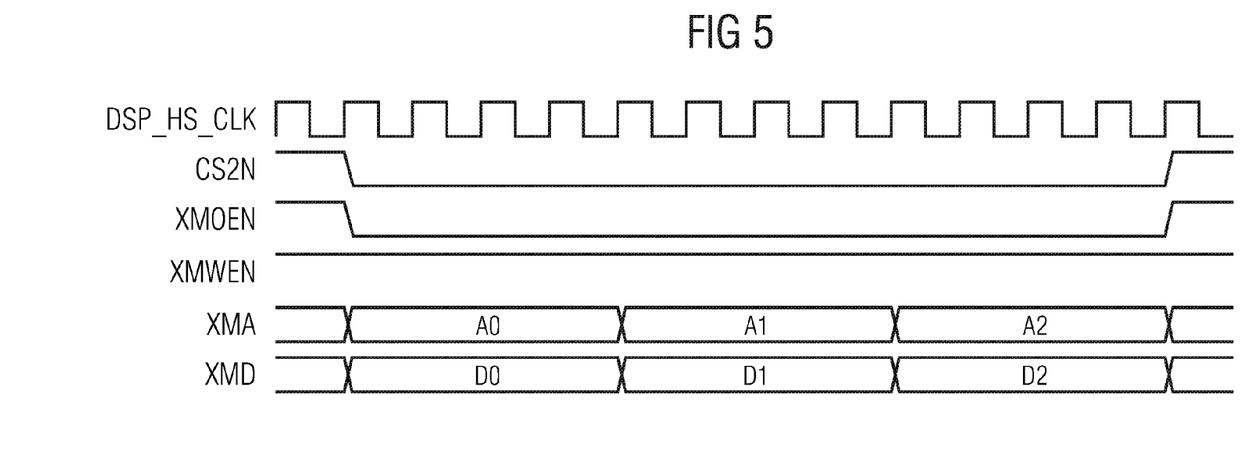
Figures 6, 7:
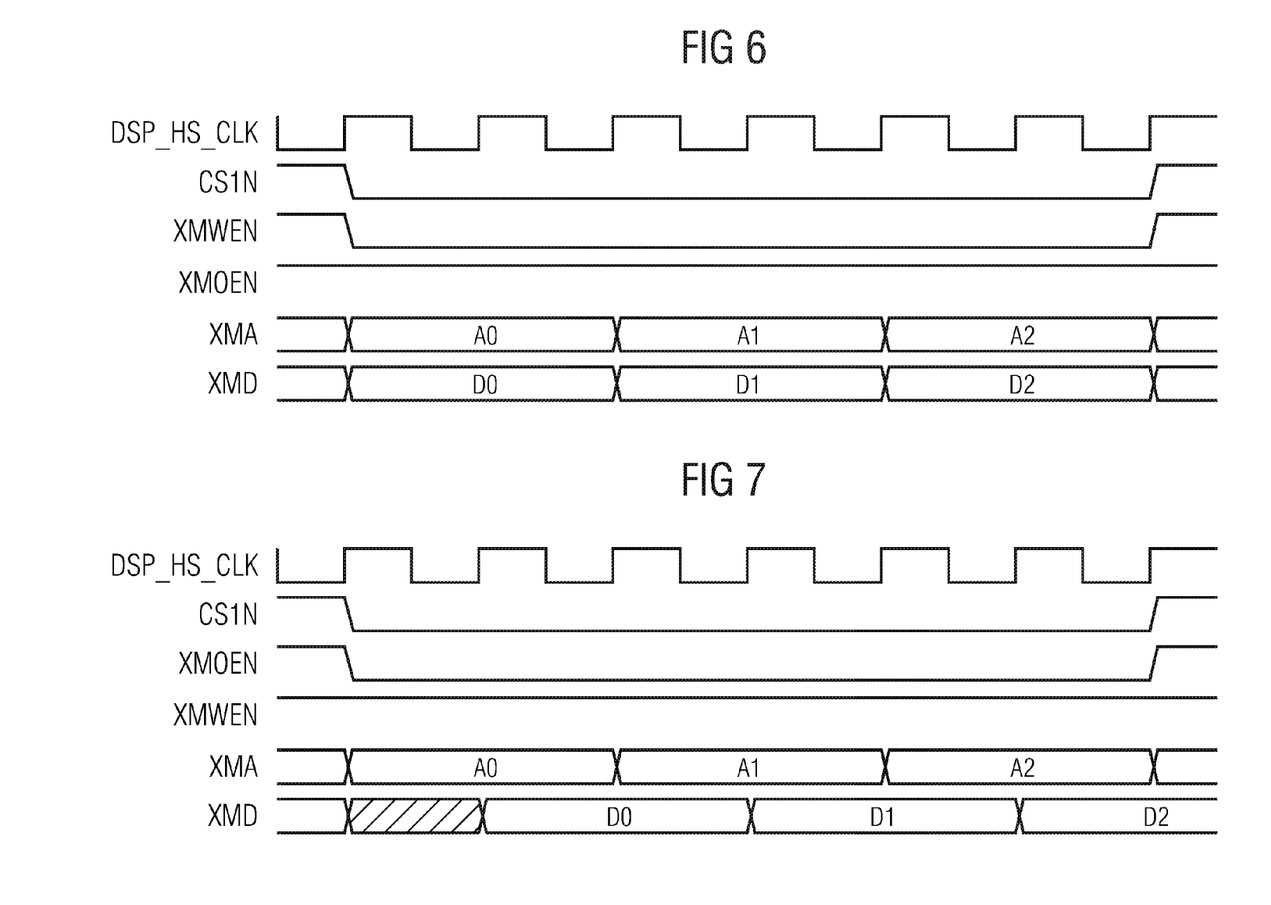

Note that in the processes in FIGS. 2 to 5 each bit of the data on the lines XMA, XMD is transmitted during 4 clock cycles of the integrated circuit that has control of the data bus 5. While this may be required in some applications since four of clock cycles may be required for reliable data transmission (e.g., if the number of integrated circuits 1, 2, 3, 4 is high), it will be possible to transmit the data reliably more rapidly in certain other applications using a smaller number of clock cycles per data bit. The integrated circuits 1, 2, 3, 4 themselves may be operative to determine how many clock cycles are required to transmit data reliably in a given application, or alternatively this may be programmable by an operator of the line card 10. FIGS. 6 and 7 show respectively how FIGS. 4 and 5 are modified in the case that two clock cycles are used for each bit of the data on lines XMA, XMD.

The arbitration process, which determines at any time which of the integrated circuits 1, 2, 3, 4 has control of the data bus 5 is performed by the arbitration managers 17, 27, 37, 47, using the arbitration bus 7. Any of a number of arbitration mechanisms may be used, such as a round robin scheme. For example, control of the data bus 5 may be circulated through the integrated circuits 1, 2, 3, 4 in that order. When a given integrated circuit has instantaneous control of the data bus 5 it is said to have a "token". The integrated circuit can renounce that token, thus passing control of the data bus 5 to the next of the integrated circuits 1, 2, 3, 4. The arbitration manager 17, 27, 37, 47 renounces the token by transmitting a renounce signal to the arbitration bus 7. The other integrated circuits recognize this renounce signal, and the next one of the integrated circuits assumes control of the data bus 5, until it too transmits a renounce signal, thus transferring the token again.

A given arbitration manager 17, 27, 37, 44 transmits the renounce signals: (i) when it has control of the data bus 5 but its respective program manager 14, 24, 34, 44 has not indicated that it requires control of the data bus, or (ii) when it has had control of the data bus 5 for a predetermined time (the arbitration manager 17, 27, 37, 47 preferably includes a timer circuit for measuring this time).

It may happen that the processors 12, 22, 32, 42 of one or more of the integrated circuits crash, and have to be reinitialized. This crash could potentially cause a crash also in the corresponding arbitration manager 17, 27, 37, 47, which could lead to the renounce signal never being transmitted. If the arbitration manager is not operating, this could potentially interrupt the processing in the other integrated circuits. For that reason, each integrated circuit 1, 2, 3, 4 also includes a watchdog unit 18, 28, 38, 48. Each watchdog unit monitors its own integrated circuit, and if a crash is detected, transmits a warning signal to the arbitration manager of the successive integrated circuit, indicating to that arbitration manager that it should not wait for the renounce signal before assuming control of the data bus 5.

The watchdog units 18, 28, 38, 48 each have a simple design, which is intended not to crash even when the rest of the respective integrated circuit does. For example, each may simply be a timer circuit, which transmits the warning signal whenever it determines that its respective integrated circuit has held the token for more than a predetermined time.

If all the integrated circuits 1, 2, 3, 4 share a clock signal, then the process of transferring data between them is relatively straightforward.

However, alternatively the integrated circuits may operate according to respective clock signals (e.g., internally generated clock signals) having the same frequency, but which are not in sync with each other. In this case, the program managers 14, 24, 34, 44 are provided with respective sync units 15, 25, 35, 45, which measure the difference in timing between their own clock and the clock signal DSP_HS_CLK of the integrated circuit, which presently has control of the data bus. The sync units 15, 25, 35, 45 preferably determine the timing of the clock signal DSP_HS_CLK of the integrated circuit that has control of the data bus 5 based on the signal CS1N. This is because CS1N is transmitted with a pre-known timing relationship to the clock signal DSP_HS_CLK.

In the case that the data manager of a given integrated circuit is to read data from the lines XMD of the data bus 5, the sync unit of that integrated circuit controls the corresponding data manager to do so with a timing, which compensates for the timing of the clock signal DSP_HS_CLK of the integrated circuit that presently has control of the data bus 5.

Figure 8:
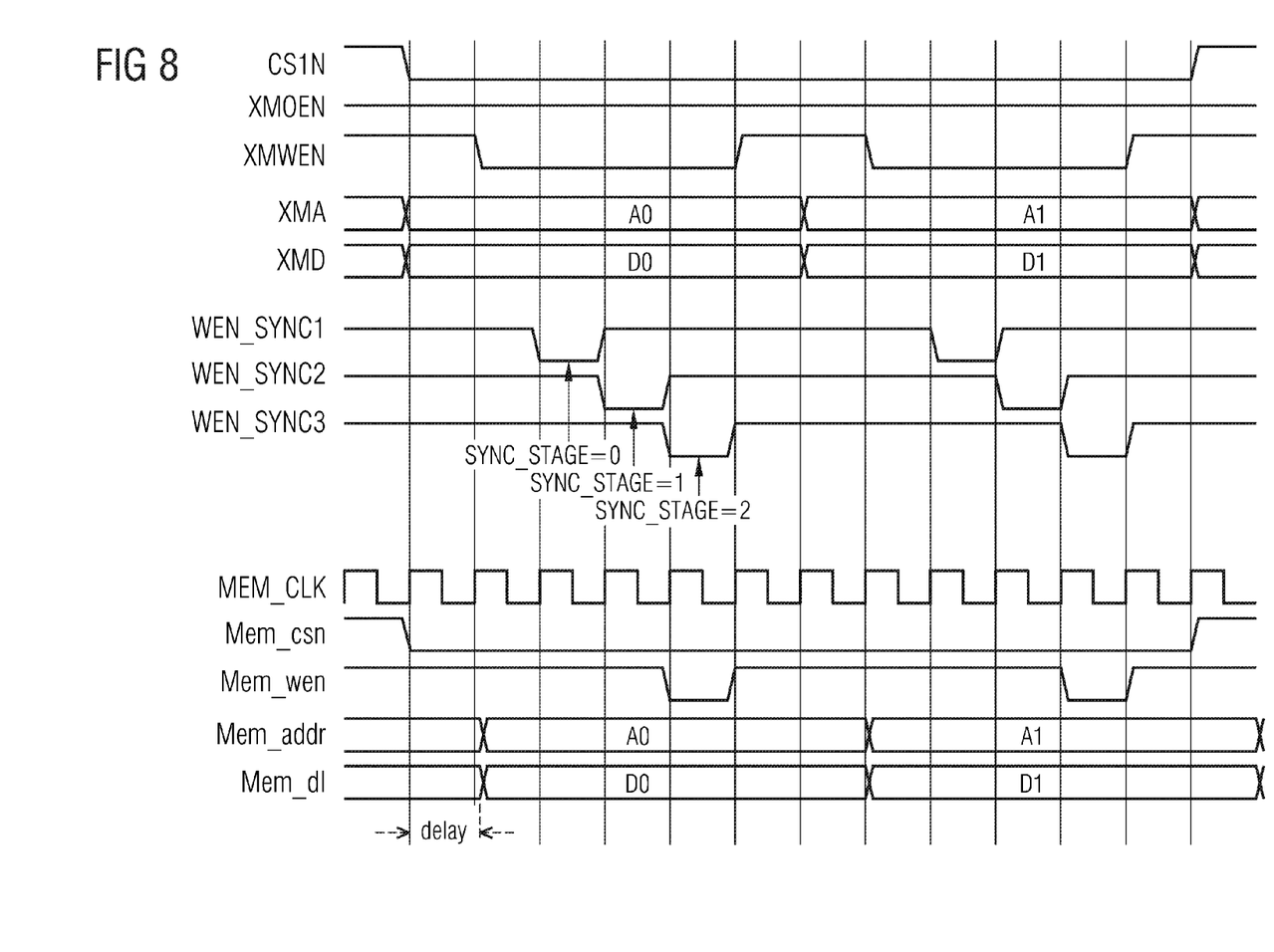
FIG. 8 shows a synchronization process performed by the embodiment of FIG. 1.

This process is illustrated in FIG. 8, where the signals transmitted by the integrated circuit (say integrated circuit 1), which has control of the data bus 5 on lines CS1N, XMOEN, XMWEN, XMA and XMD are the same as in FIG. 2 (DSP_HS_CLK itself is omitted for simplicity). The bottom portion of FIG. 8 shows signals generated within another of the integrated circuits (say integrated circuit 2). The sync unit 25 uses CS1N, XMWEN and the internal clock (MEM_CLK) of integrated circuit 2 to generate three delayed forms of the signal WEN_SYNC1, WEN_SYNC2 and WEN_SYNC3, which are then used in three respective sync stages. MEM_CLK is the clock of the integrated circuit 2, and signals Mem_csn, Mem_wen and Mem_addr are internal signals of the integrated circuit 2 transmitted to its program memory 21. In response, the memory 21 transmits the data stored at the address indicated by Mem_addr as the signal Mem_dl. Since MEM_CLK of integrated circuit 2 is not in sync with DSP_HS_CLK of integrated circuit 1, there is a timing delay as shown by the dashed arrows. The sync unit 25 compensates for this, to ensure that the data transmitted onto the bus 5 is in sync with DSP_HS_CLK.

In the case that the data manager of a given integrated circuit is to transmit data onto the data bus 5 (in response to a read signal), the sync unit of that integrated circuit controls the corresponding program manager to do so with a timing, which accords to the clock signal DSP_HS_CLK of the integrated circuit that has control of the data bus 5.

The organization of the memory space in alternative preferred embodiments of the invention is now discussed with reference to FIGS. 9, 10 and 11. These figures relate to a variant of the embodiment of FIG. 1. In this variant preferred embodiment, the line card contains 16 integrated circuits (i.e., N=16), instead of 4. In all other respects, the embodiments are the same.

Figure 9:
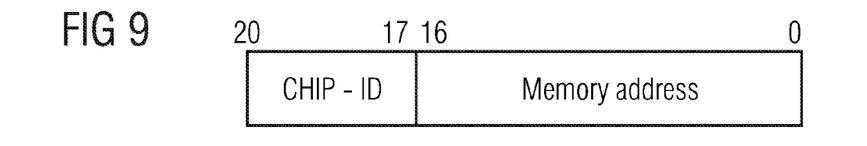
FIG. 9 illustrates the structure of an on-chip memory address in a second embodiment of the invention.

FIG. 9 is a representation of the address of a bit of the data in the case that the capacity of each of the program memories is, as a non-limiting example, 224 kB (01BFFF bits in hexadecimal representation). The address is composed of four bits (bits 17 to 20) specifying the integrated circuit, and 17 bits (0 to 16) specifying a memory location within the program memory of that particular integrated circuit.

Figure 10:
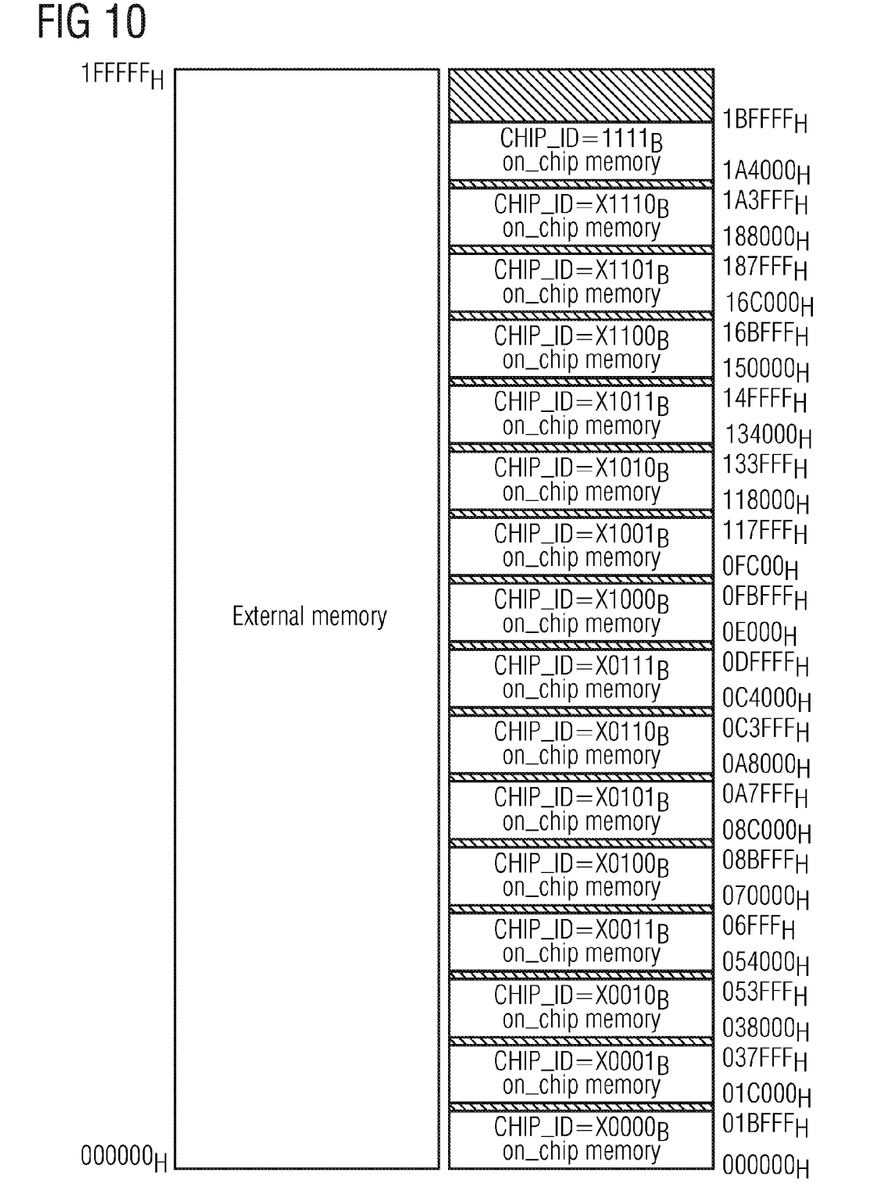
FIG. 10 illustrates a first address map for the line card, which may be used in the embodiment of FIG. 9.

FIG. 10 illustrates a memory address map of a first possible arrangement of the program within the memories 11, 21, 31, 41. The term "CHIP_ID=X" refers to bits 17 to 20 in FIG. 9. The subscript "B" means binary, and the subscript "H" means hexadecimal.

Figure 11:
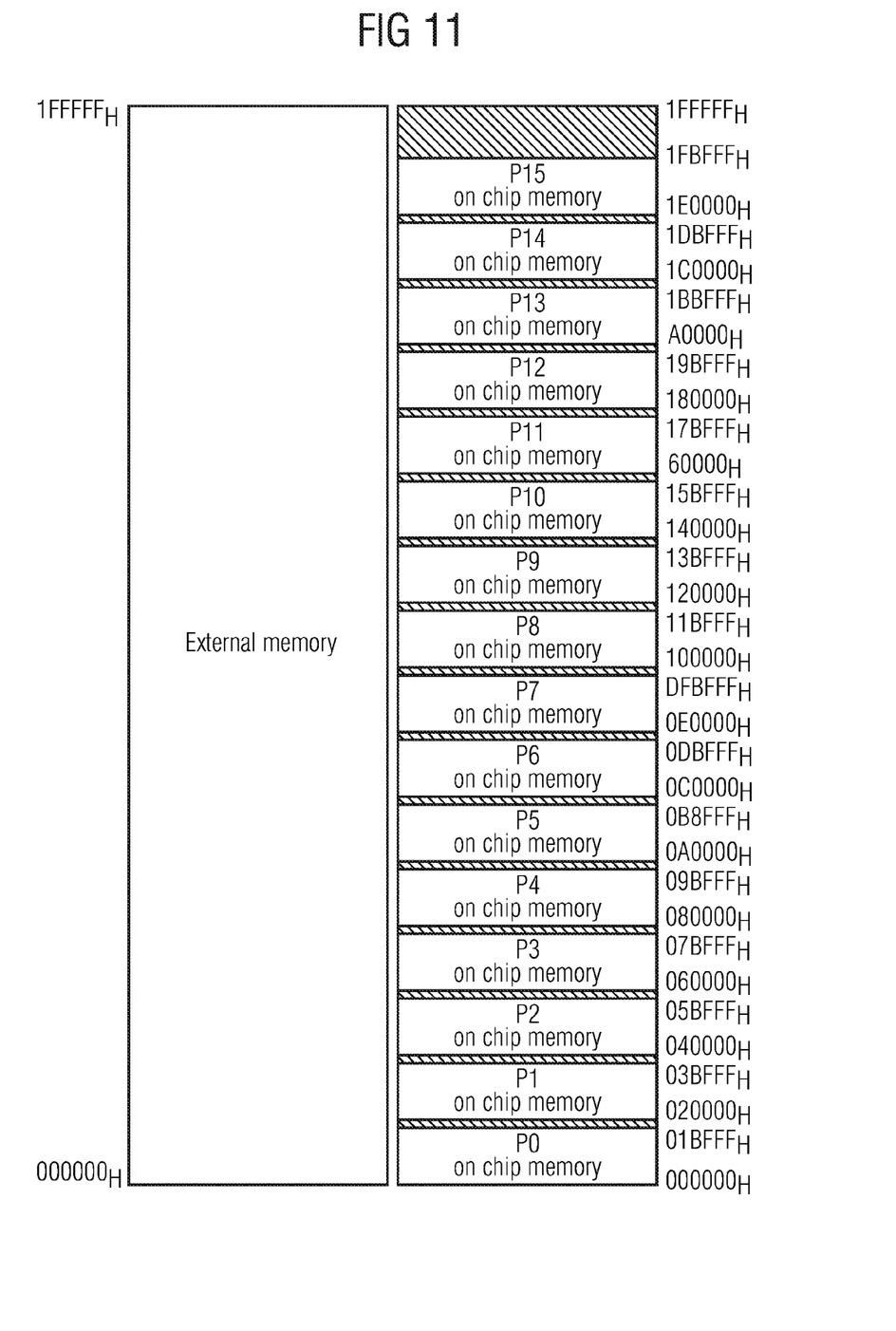
FIG. 11 illustrates an alternative address map for the line card, which may be used in the embodiment of FIG. 10.

FIG. 11 is a program memory address map for an alternative possible arrangement of the program within the program memories 11, 21, 31, 41. The 16 integrated circuits (referred to as P0, P1, ..., P15) each have a respective on-chip program memory, and a further external memory is provided by the optional memory unit 6. In this case, each of the program memories includes a portion, which is unused (and shown as shaded). This unused memory portion is available for storage of other sorts of data the integrated circuits may require. This possible arrangement of FIG. 11 permits faster program decoding, but with the disadvantage that there is more segmentation of the program within the memory space.

Although the invention has been described with reference only to the preferred embodiments and alternatives detailed above, many variations are possible within the scope of the invention as will be clear to a skilled reader.

For example, although FIG. 1 indicates that the integrated circuits each have a number of different components, these components are typically provided as respective portions of a single monolithic integrated circuit. Alternatively, two or more of the components of the integrated circuits of FIG. 1 may correspond to respective sections of software, which are processed by a single microprocessor. That is, the single microprocessor may perform the function of more than one of the components.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system including a plurality of integrated circuits, each of the plurality of integrated circuits comprising:
   a processor for performing a program code of a program;
   a program memory for storing a first portion of the program code of the program;
   a second memory; and
   a program manager configured to
      monitor progress of the processor,
      obtain a second portion of the program code of the program that is not stored in the program memory from a program memory of another one of the plurality of integrated circuits prior to the processor requiring the second portion of the program code of the program, and
      store the second portion of the program code of the program in the second memory;
   wherein
      the processor is configured to run the second portion of the program code of the program from the second memory, and
      the program memories of the plurality of integrated circuits collectively store all of the program code of the program.

2. The system of claim 1, wherein:
   the plurality of integrated circuits comprises N integrated circuits, and
   the program memory of each of the N integrated circuits is configured to store about 1/N-th of the program code of the program.

3. The system of claim 1, wherein the program implements a DSL-protocol-specific program for generating signals for transmission along a DSL in a DSL-protocol and/or decoding signals received along the DSL in the DSL-protocol.

4. The system of claim 3, wherein the system comprises a line card for a communications system.

5. The system of claim 1, further including a bus coupled to a first of the plurality of integrated circuits and a second of the plurality of integrated circuits, wherein a program manager of the first of the plurality of integrated circuits is configured to communicate with a program manager of the second of the plurality of integrated circuits.

6. The system of claim 1, wherein the program manager is configured to obtain the first portion of the program code of the program from the program memory, prior to the processor requiring the first portion of the program code of the program, and to store the first portion of the program code of the program in the second memory; and wherein the processor is configured to run the first portion of the program of the program from the second memory.

7. The system of claim 1, wherein the program memory of each of the plurality of integrated circuits has a same capacity.

8. The system of claim 1, wherein each of the plurality of integrated circuits further comprises a synchronization mechanism configured to obtain a synchronization signal indicative of a difference between a timing of a clock cycle of a first of the plurality of integrated circuits and a clock cycle of a second of the plurality of integrated circuits, the synchronization signal being used to modify an operation of the first of the plurality of integrated circuits.

9. The system of claim 8, wherein the synchronization mechanism further comprises a plurality of delay circuits outputting respective versions of a timing signal, the synchronization mechanism being operative to employ outputs of the delay circuits to form the synchronization signal.

10. The system of claim 9, wherein the delay circuits comprise one or more flip-flop circuits.

11. The system of claim 10, wherein a number of the one or more flip-flop circuits used are programmable.

12. The system of claim 9, wherein a number of delay circuits employed to produce the synchronization signal is programmable.

13. The system of claim 1, further comprising:
   a data bus, wherein each of the plurality of integrated circuits is configured to communicate with the data bus; and
   an arbitration mechanism configured to share control of the data bus among the program managers of the plurality of integrated circuits.

14. The system of claim 13, wherein:
   the arbitration mechanism further comprises an arbitration bus; and
   each of the plurality of integrated circuits comprises an arbitration manager operative to transmit a signal to the arbitration bus, the signal indicative of a corresponding integrated circuit relinquishing control of the data bus.

15. The system of claim 14, in which each of the plurality of integrated circuits further comprises a watchdog mechanism configured to transfer control of the data bus from the integrated circuit in case of a failure in the operation of the integrated circuit.

16. The system of claim 15, wherein the watchdog mechanism ensures that an arbitration process is not suspended in the case of the failure in the operation of the integrated circuit.

17. The system of claim 15, wherein the watchdog mechanism ensures that data bus access is shared between remaining operational circuits in the case of the failure in the operation of the integrated circuit.

18. The system of claim 15, wherein the watchdog mechanism is configured to transmit a warning signal in the case of the failure in the operation of the integrated circuit.

19. The system of claim 15, wherein the watchdog mechanism further comprises a timer mechanism configured to transfer control of the data bus away from a first of the plurality of integrated circuits after the first of the plurality of integrated circuits has had control of the data bus for a predetermined time.

20. A system including a plurality of integrated circuits, each of the plurality of integrated circuits comprising:

a processor configured to perform a program code of a program; a program memory configured to store a first portion of the program code of the program; a second memory; and a program manager configured to monitor progress of the processor, obtain a second portion of the program code of the program that is not stored in the program memory from a program memory of another one of the plurality of integrated circuits prior to the processor requiring the second portion of the program code of the program, and store the second portion of the program code of the program in the second memory; and wherein the system further includes a memory unit configured to store a third portion of the program code of the program, the memory unit and the program memories of the integrated circuits collectively storing all of the program, the program manager of at least one of the plurality of integrated circuits is configured to obtain a portion of the program code of the program that is not stored in the program memories of the plurality of integrated circuits from the memory unit prior to the processor of the at least one of the plurality of integrated circuits requiring that portion of the program code of the program, and the processor is configured to run the second and third portion of the program code from the second memory.

21. The system according to claim 20, wherein:
the plurality of integrated circuits comprises N integrated circuits, and
the program memory of each of the N integrated circuits is configured to store about 1/N-th of the program code of the program.

22. The system according to claim 20, wherein the program manager is configured to obtain the first portion of the program code of the program from the program memory, prior to the processor requiring the first portion of the program code of the program, and to store the first portion of the program code of the program in the second memory; and wherein the processor is configured to run the first portion of the program code of the program from the second memory.

23. The system according to claim 20, wherein each of the plurality of integrated circuits comprises a watchdog timer configured to:
ensure that an arbitration process is not suspended in case of a failure in operation of the integrated circuit; and
ensure that data bus access is shared between remaining operational integrated circuits in the case of the failure in the operation of the integrated circuit.

24. An integrated processor circuit for use in a system of integrated processor circuits executing a program, wherein each integrated processor circuit comprises:
a processor configured to perform a program code of a program;
a program memory configured to store a first portion of the program code of the program;
a second memory; and
a program manager configured to:
monitor progress of the processor,
obtain a second portion of the program code of the program that is not stored in the program memory from the program memory of another one of the integrated processor circuits, and
store the second portion of the program code of the program in the second memory prior to the processor requiring the second portion of the program,
wherein the processor is configured to run the second portion of the program code of the program from the second memory.

25. The integrated processor circuit of claim 24, wherein:
the integrated processor circuits comprise N integrated circuits, and
the first portion of the program code of the program comprises about 1/N-th a size of the program code of the program.

26. The integrated processor circuit of claim 24, wherein the program manager is configured to obtain the first portion of the program code of the program from the program memory, prior to the processor requiring the first portion of the program code of the program, and to store the first portion of the program code of the program in the second memory; and wherein the processor is configured to run the first portion of the program code of the program from the second memory.

27. A method for operating a system comprising integrated processor circuits, each integrated processor circuit having a processor configured to perform a program code of a program and a program memory, wherein at least a first integrated processor circuit of the integrated processor circuits further having a second memory, the method comprising:
performing a first portion of the program code of the program on a processor of the first integrated processor circuit, the first portion being stored in a program memory of the first integrated processor circuit;
monitoring progress of the processor of the first integrated processor circuit in performing the first portion of the program code of the program;
prior to the processor of the first integrated processor circuit requiring a second portion of the program code of the program that is not stored in the program memory of the first integrated processor circuit, obtaining the second portion of the program code of the program from the program memory of another one of the integrated processor circuits;
storing the second portion of the program code of the program in the second memory of the first integrated processor circuit; and
performing the second portion of the program code of the program on the processor of the first integrated processor circuit, wherein the second portion is run from the second memory of the first integrated processor circuit.

28. The method of claim 27, wherein:
the integrated processor circuits comprise N integrated processor circuits; and
the first portion of the program code of the program comprises a size of about 1/N-th a size of the program code of the program.

29. The method of claim 27, wherein the system further comprises a memory device in addition to the integrated processor circuits, the memory device storing a third portion of the program code of the program, the method further comprising:
obtaining the third portion of the program code of the program from the memory device; and
performing the third portion of the program code of the program on the processor of the first integrated processor circuit.

30. The method of claim 27, wherein all of the program code of the program is stored in program memories of the integrated processor circuits of the system.

31. The method of claim 27, wherein the program code of the program is too large to be stored in the program memories of the integrated processor circuits of the system.

32. The method of claim 31, wherein the system further comprises an additional memory; and
wherein all of the program is stored in the program memories of the integrated processor circuits and the additional memory.

33. The method of claim 27, further comprising:
prior to the processor requiring the first portion of the program, obtaining the first portion of the program code of the program from the program memory of the first integrated circuit, storing the first portion of the program code of the program in the second memory of the first integrated circuit; and
performing the first portion of the program code of the program on the processor of the first integrated circuit, wherein the first portion is run from the second memory.

* * * * *